United States Patent
Coffen et al.

(10) Patent No.: US 6,640,234 B1
(45) Date of Patent: Oct. 28, 2003

(54) EXTENSION OF FORMULAS AND FORMATTING IN AN ELECTRONIC SPREADSHEET

(75) Inventors: Robert Wayne Coffen, Redmond, WA (US); Kent Rogers Lowry, Seattle, WA (US); Eric Lawrence Matteson, Bellevue, WA (US); Mark S. Igra, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/224,341

(22) Filed: Dec. 31, 1998

(51) Int. Cl.$^7$ .............................................. G06F 17/21

(52) U.S. Cl. ...................................... 707/538; 707/503

(58) Field of Search ............................. 707/503, 504, 707/538

(56) References Cited

U.S. PATENT DOCUMENTS

| | | | | |
|---|---|---|---|---|
| 5,247,611 A | * | 9/1993 | Norden-Paul et al. | 707/504 |
| 5,255,356 A | * | 10/1993 | Michelman et al. | 707/504 |
| 5,396,587 A | * | 3/1995 | Reed et al. | 707/503 |
| 5,418,898 A | * | 5/1995 | Zand et al. | 707/503 |
| 5,418,902 A | * | 5/1995 | West et al. | 707/503 |
| 5,471,575 A | * | 11/1995 | Giansante | 707/503 |
| 5,510,980 A | * | 4/1996 | Peters | 707/503 |
| 5,535,324 A | * | 7/1996 | Alvarez et al. | 707/503 |

(List continued on next page.)

OTHER PUBLICATIONS

Anonymous, "Method and Apparatus for Automatic Character line fill of Decimal Fields." IBM technical Disclosure Bulletin vol. 36, No. 10, pp. 155–156, Oct. 1993.*

Miastkowski, S. "Excel 5.0—a Quick–start Guide to Using Excel's Powerful New Features." Macworld vol. 11, No. 10, pp. 146–151, Oct. 1994.*

Microsoft Corp. Help file on 'series' 'repeated entries', and 'Auto Fill' (screen shot) of Microsoft Excel 97 (1996), 6 pages, taken Mar. 2001.*

Crew, Ed, ed. "Lesson in Excel 97: Lesson One . . . ", Web page tutorial on Excel 97 downloaded from pathways.u-we.ac.uk/Edict/Excel/Excel–01.asp on Mar. 29, 2002, 6 pages.*

Sonic.net. "Microsoft Excel 5.0 (tips on using MS Excel 5.0 repeat entries)" downloaded from www.sonic.net/~sbaumann/excel.html 5 pages on Apr. 2, 2002.*

*Primary Examiner*—Stephen S. Hong
(74) *Attorney, Agent, or Firm*—Merchant & Gould

(57) ABSTRACT

Methods for automatically, without user instruction, extending a format and/or a formula to include a cell in an electronic spreadsheet. A previously blank newly edited cell may be determined to be an extension to or within a list of cells. A list of cells may be defined as a number of previous cells having a consistent data type. If a list of cells exists and the previously blank newly edited cell also includes the consistent data type, the previously blank newly edited cell is considered to be an extension of or within a list. The cells in the list are then examined for consistent formatting. If consistent formatting exists in the list, the consistent formatting is applied to the previously blank newly edited cell. Also, the cells in the list are examined for consistent formulas. The rows containing the cells in the list are each examined for a consistent formula having all supporting cells populated. If such a consistent formula is detected, it is applied to the row containing the previously blank newly edited cell. Also, the spreadsheet is scanned for aggregating formulas that reference the cells within the list. If an aggregating formula is discovered, it is updated to include the value of the data stored in the previously blank newly edited cell.

14 Claims, 6 Drawing Sheets

U.S. PATENT DOCUMENTS

| | | | | |
|---|---|---|---|---|
| 5,553,215 A | * | 9/1996 | Kaethler | 707/503 |
| 5,598,519 A | * | 1/1997 | Narayanan | 707/504 |
| 5,600,584 A | * | 2/1997 | Schlafly | 707/504 |
| 5,604,854 A | * | 2/1997 | Glassey | 707/504 |
| 5,685,001 A | * | 11/1997 | Capson et al. | 707/503 |
| 5,701,499 A | * | 12/1997 | Capson et al. | 707/503 |
| 5,708,827 A | * | 1/1998 | Kaneko et al. | 707/503 |
| 5,752,253 A | * | 5/1998 | Geymond et al. | 707/503 |
| 5,812,983 A | * | 9/1998 | Kumagai | 707/503 |
| 5,819,293 A | * | 10/1998 | Comer et al. | 707/503 |
| 5,881,381 A | * | 3/1999 | Yamashita et al. | 707/503 |
| 5,890,174 A | * | 3/1999 | Khanna et al. | 707/504 |
| 5,926,822 A | * | 7/1999 | Garman | 707/504 |
| 5,987,481 A | * | 11/1999 | Michelman et al. | 707/503 |
| 6,055,548 A | * | 4/2000 | Comer et al. | 707/538 |
| 6,055,549 A | * | 4/2000 | Takano | 707/503 |
| 6,112,214 A | * | 8/2000 | Graham et al. | 707/539 |
| 6,134,563 A | * | 10/2000 | Clancey et al. | 707/503 |
| 6,138,130 A | * | 10/2000 | Adler et al. | 707/504 |
| 6,216,139 B1 | * | 4/2001 | Listou | 707/503 |
| 6,292,811 B1 | * | 9/2001 | Clancey et al. | 707/538 |

* cited by examiner

Fig. 1A

|   | A | B | C | D | E | F | G | H |
|---|---|---|---|---|---|---|---|---|
| 1 | 1 | 8.00 | 15 | 22.00 | 29 | 36.00 |  | 111 |
| 2 | 2 | 9.00 | 16 | 23.00 | 30 | 37.00 |  | 117 |
| 3 | 3 | 10.00 | 17 | 24.00 | 31 | 38.00 |  | 123 |
| 4 | 4 | 11.00 | 18 | 25.00 | 32 | 39.00 |  | 129 |
| 5 | 5 | 12.00 | 19 | 26.00 | 33 | 40.00 |  | 135 |
| 6 | 6 | 13.00 | 20 | 27.00 | 34 | 41.00 |  | 141 |
| 7 | 7 | 14.00 | 21 | 28.00 | 35 |  |  |  |
| 8 |  |  |  |  |  |  |  |  |
| 9 |  |  |  |  |  |  |  |  |
| 10 |  |  |  |  |  |  |  |  |
| 11 |  |  |  |  |  |  |  |  |
| 12 |  |  |  |  |  |  |  |  |
| 13 |  |  |  |  | 231 |  |  |  |

Fig. 1B

|   | A | B | C | D | E | F | G | H |
|---|---|---|---|---|---|---|---|---|
| 1 | 1 | 8.00 | 15 | 22.00 | 29 | 36.00 |  | 111 |
| 2 | 2 | 9.00 | 16 | 23.00 | 30 | 37.00 |  | 117 |
| 3 | 3 | 10.00 | 17 | 24.00 | 31 | 38.00 |  | 123 |
| 4 | 4 | 11.00 | 18 | 25.00 | 32 | 39.00 |  | 129 |
| 5 | 5 | 12.00 | 19 | 26.00 | 33 | 40.00 |  | 135 |
| 6 | 6 | 13.00 | 20 | 27.00 | 34 | 41.00 |  | 141 |
| 7 | 7 | 14.00 | 21 | 28.00 | 35 | 42.00 |  |  |
| 8 |  |  |  |  |  |  |  |  |
| 9 |  |  |  |  |  |  |  |  |
| 10 |  |  |  |  |  |  |  |  |
| 11 |  |  |  |  |  |  |  |  |
| 12 |  |  |  |  |  |  |  |  |
| 13 |  |  |  |  | 231 |  |  |  |

Fig. 1C

|   | A | B | C | D | E | F | G | H |
|---|---|---|---|---|---|---|---|---|
| 1 | 1 | 8.00 | 15 | 22.00 | 29 | 36.00 |  | 111 |
| 2 | 2 | 9.00 | 16 | 23.00 | 30 | 37.00 |  | 117 |
| 3 | 3 | 10.00 | 17 | 24.00 | 31 | 38.00 |  | 123 |
| 4 | 4 | 11.00 | 18 | 25.00 | 32 | 39.00 |  | 129 |
| 5 | 5 | 12.00 | 19 | 26.00 | 33 | 40.00 |  | 135 |
| 6 | 6 | 13.00 | 20 | 27.00 | 34 | 41.00 |  | 141 |
| 7 | 7 | 14.00 | 21 | 28.00 | 35 | 42.00 |  | 147 |
| 8 |  |  |  |  |  |  |  |  |
| 9 |  |  |  |  |  |  |  |  |
| 10 |  |  |  |  |  |  |  |  |
| 11 |  |  |  |  |  |  |  |  |
| 12 |  |  |  |  |  |  |  |  |
| 13 |  |  |  |  | 231 |  |  |  |

EXTENSION OF FORMULAS AND FORMATTING IN AN ELECTRONIC SPREADSHEET

TECHNICAL FIELD

The present invention generally relates to formulas and formatting applied to cells in an electronic spreadsheet. More particularly, the present invention relates to the detection in an electronic spreadsheet of a list of cells having consistent formulas and/or formatting and extension of said formulas and/or formatting to include a cell appended to or edited within said list.

BACKGROUND OF THE INVENTION

Electronic spreadsheets organize information into a matrix of columns and rows. Each column within a row is referred to as a cell. Each cell of an electronic spreadsheet stores a data element or a formula that uses data elements from other cells to calculate a desired result. As an example, a formula may be used to calculate the sum of data elements stored in the cells comprising a column or a row of an electronic spreadsheet. To ease computation, electronic spreadsheets include built-in functions that perform most standard mathematical operations.

For on-screen viewing and printed output, electronic spreadsheets may also include functionality to apply a variety of formatting options to a cell. Exemplary formatting options include: font face, color, size and style; border style and color; background color; conditional formatting rules; etc. Formatting may usually be accomplished per cell or per a group of cells. Thus, a typical electronic spreadsheet may include a variety of different formats at any given time.

Prior electronic spreadsheets require a user to manually apply formulas and/or formatting to selected cells through commonly known user interface techniques, such as selecting options from a pull-down menu. Skilled users of such prior systems may also take advantage of built-in short-cuts, such as copy/paste functions, to extend formulas and/or formatting to include newly selected cells. In particular, shorts-cuts have proven effective for extending formulas and/or formatting to include cells that are appended to or edited within a list of cells having a consistent formula or format or aggregating formulas. However, short-cuts do not eliminate the need for manual user interaction in order to extend formulas and/or formatting. Thus, a significant drawback found in prior electronic spreadsheets is the inability to automatically extend, without instruction from the user, a formula or format to include a cell that is appended to or edited within a list of cells.

Accordingly, there is a need for an electronic spreadsheet that is able to recognize a list of cells having a consistent formula and/or formatting and/or aggregating formulas applied thereto and to automatically extend such consistent formula and/or formatting and/or aggregating formulas to include a cell that is appended to or edited within the list.

SUMMARY OF THE INVENTION

The present invention fulfills the needs in the art by providing an electronic spreadsheet with functionality for automatically extending, without user instruction, formulas and/or formatting to include new cells. Since the present invention extends formatting and formulas without user instruction to do so, care is taken to insure that the user would desire such an operation. Thus, the present invention only automatically extends formatting and formulas to include cells that appear to be extensions of or within existing lists of cells having consistent formulas or formatting applied thereto. A list is defined herein as a number of successive cells, in a row or a column, having a consistent data type. A previously blank newly edited cell is an extension of a list if it also has the consistent data type. Once an extension of a list is identified, the list is examined for consistent formatting and/or formulas and/or aggregating formulas. If the list has consistent formatting, the consistent formatting is automatically applied to the previously blank newly edited cell. If a first consistent formatting exists in a column list and a second consistent formatting exists in a row list, the first formatting of the column list may be given priority and applied to the previously blank newly edited cell. List-related formulas may exist in two forms: first, a number of the rows above the previously blank newly edited cell may have the same formula, with all supporting rows filled in on the same row as the previously blank newly edited cell, applied thereto; and second, an aggregating formula may reference a number of the cells in the list. If either of these types of formulas are detected they are automatically updated to include the previously blank newly edited cell.

BRIEF DESCRIPTION OF THE DRAWINGS

FIG. 1A illustrates an initial display state of an electronic spreadsheet prior to operation of an exemplary embodiment of the present invention;

FIG. 1B illustrates an edit mode display state of an electronic spreadsheet when a user selects and edits a previously blank cell adjacent to a list of cells;

FIG. 1C illustrates a final display state of an electronic spreadsheet subsequent to operation of an exemplary embodiment of the present invention;

DETAILED DESCRIPTION OF THE EXEMPLARY EMBODIMENTS

Figure 2:
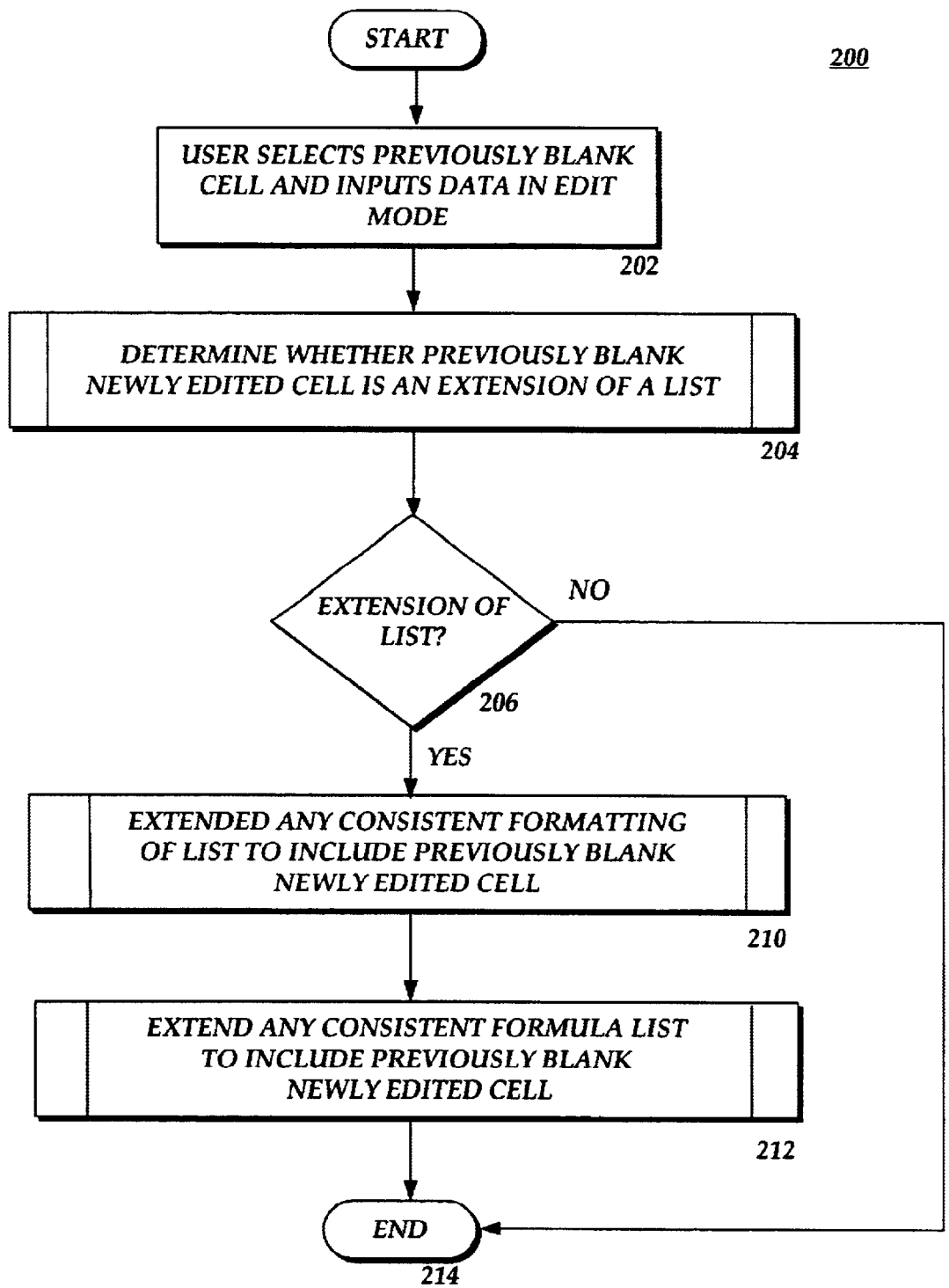
FIG. 2 is a flow chart demonstrating the general steps involved in the operation of an exemplary embodiment of the present invention.

The present invention provides an electronic spreadsheet with functionality for automatically (i.e., without instruction from the user) extending consistent formulas and/or formatting of a list of cells to include previously blank, newly edited cells appended to or edited within the list. The general concept of the present invention involves determining whether a previously blank, newly edited cell is an extension of or within a list of cells. If the previously blank cell is determined to be an extension of or within a list of cells, the list is examined to determine whether the cells therein have a consistent formula and/or format. If the previously blank cell is an extension to or within a list of cells having a consistent formula and/or formatting, it may be assumed that the consistent formulas and/or formatting are intended to be extended to include the previously blank cell.

The principles of the present invention have broad applicability, in that the automatic application of a formula or a format may be triggered based on any pre-defined criteria that may be deemed appropriate. However, a significant concern when automatically extending formulas and/or formatting to include a cell is that the user might not actually intend to take such action. In the event that an unintended formula or format is extended to include a cell, the user is forced to somehow "undo" the action. Thus, while the present invention may be configured in a variety of manners, a conservative approach has been taken in configuring the exemplary embodiments, so as to create a high probability that any automatic extension of formatting and/ or formulas is made in accordance with the expectations of the spreadsheet user.

Operation of Exemplary Embodiments

Referring now to the drawings, in which like numerals indicate like elements throughout the several figures, FIG. 1 illustrates the sequential display states of an electronic spreadsheet prior to, during and after operation of the exemplary embodiment of the present invention. FIG. 1A shows an initial display state of an exemplary electronic spreadsheet 102. The initial display state 102 corresponds to the display state of an electronic spreadsheet after the completion of any previous operations and prior to the user selecting a new cell for editing. As shown, the cells of the electronic spreadsheet have various formats and data types. In particular, cells in the range A1:A7 have an "integer" data type and are formatted with a dark background; cells in the range B1:B7 have a "real number" data type and are formatted with a bold font face; cells in the range C1:C7 have an "integer" data type and are formatted with a light background and an italicized font face; cells in the range D1:D7 have a "real number" data type and are formatted with a dark background and an italicized font face; cells in the range E1:E7 have an "integer" data type and are formatted with a bold font face; and cells in the range F1:F6 have a "real number" data type and are formatted with a light background. Cells in the range H1:H6 and cell F13 and have a "default" format (white background, normal font face, etc.) and formula data type. Cell F7 104 is blank and in its initial display state. As used herein, "blank" is intended describe a cell that contains no value or only space characters.

FIG. 1B shows an edit mode display state of the exemplary spreadsheet 102'. The edit mode display state corresponds to the display state of an electronic spread sheet 102' when the user selects a previously blank cell, namely cell F7 104', and enters data therein. The exemplary embodiment of the present invention is configured to only extend formulas or formatting when previously blank, newly edited cells are appended to or edited within a list. No action will be taken when non-blank cells are appended to or edited within a list because there is less of a probability, in that case, that the user would intend formatting or formulas to be extended. In the exemplary electronic spreadsheet 102', a cursor remains visible in the cell that is being edited 104' until the edit mode is terminated. In many electronic spreadsheets, the edit mode is terminated upon the user taking such action as depressing the "Enter" key on the keyboard 640 (see FIG. 6). In the exemplary embodiment, the present invention is invoked upon the user terminating the edit mode. From the user's perspective, operation of the exemplary embodiment occurs instantaneously upon termination of the edit mode.

When invoked, the exemplary embodiment of the present invention first determines whether the previously blank, newly edited cell F7 104' is an extension to or within a list of cells. In the exemplary embodiment, a list of cells is defined as a number of successive cells, either in a column or in a row, that have a consistent data type. Data types include numbers (integer, real number, currency, date, time etc.), characters, formulas, booleans, error values, and undetermined types (blank cells). According to the exemplary embodiment, if the data type is a formula, the formula must also be consistent for a list to exist. Thus, a scan of the data types and formulas in previous cells may be used to determine whether the previously blank newly edited cell F7 104' is an extension of or within a list.

As can be seen in FIG. 1B, the cell above the previously blank newly edited cell F7 104' form a list. Specifically, cells in the range F1:F6 all have a number data type. Thus, since the data type of the previously blank newly edited cell F7 104' is also a number, cell F7 104' is considered to be an extension of a list. The cells to the left of the previously blank newly edited cell F7 104' also form a list in the exemplary embodiment because each such leftward cell includes a value having the number data type. However, the leftward cells do not have a consistent format, as shown.

After it is determined that the previously blank newly edited cell F7 104' is an extension of a list, the formatting of the cells in the list is examined for consistency. If consistency in formatting is found, the formatting is automatically extended to include the previously blank newly edited cell F7 104'. As shown in FIG. 1B, the cells (F1:F6) in the list above cell F7 104' are consistently formatted with a light background. Similarly, the cells in the list are examined to determine whether a consistent formula is applied thereto. If it is detected that there is a column of consistent formulas, having all supporting cells filled in, adjacent to or within the list, then the consistent formula will be copied to the row containing the previously blank newly edited cell. As shown in FIG. 1B, each of the rows above cell F7 104' have a consistent summation formula applied thereto. Specifically, each of the cells H1:H6 store the sum of the values of the cells in their respective rows: cell H1 records the sum of the values stored in cells A1:F1; cell H2 records the sum of the values stored in cells A2:F2; cell H3 records the sum of the values stored in cells A3:F3; cell H4 records the sum of the values stored in cells A4:F4; cell H5 records the sum of the values stored in cells A5:F5; and cell H6 records the sum of the values stored in cells A6:F6. Also, if a formula is detected that aggregates cells in the list, the formula will be extended to include the new cell. As shown in FIG. 1B, cell F13 108 records the aggregate sum of the values stored in the list of cells F1:F6. Therefore, the sum of cell F13 108 will be updated to include the value entered into the previously blank newly edited cell F7 104'.

FIG. 1C shows a final display state of an exemplary electronic spreadsheet 102". The final display state corresponds to the display state of the electronic spreadsheet 102" after operation of the present invention. As can be seen from the FIG. 1C, the previously blank, newly edited cell F7 104" has been altered such that the consistent format (light background) from the list of cells F1:F6 has been applied thereto. Further, the consistent summation formula applied to the cells in the rows above cell F7 104" has been applied to the list containing the previously blank, newly edited cell F7 104", such that the sum of the values stored in the cells in the range A7:F7 has been recorded in cell H7 106. Lastly, the aggregating formula applied to cell F13 108' has been updated to include the value of the data in cell F7 104". Therefore, the detected consistent formulas and formatting have been extended to include the previously blank, newly edited cell F7 104".

FIG. 2 is a flow chart generally describing the steps involved in the operation of the exemplary embodiment of the present invention. The method begins at step 202, where the user of an electronic spreadsheet selects a previously blank cell and inputs data therein in an edit mode. As mentioned, the exemplary embodiment is configured to operate only upon detection of previously blank newly edited cells appended to or edited within a list. No formula or format will be extended to non-blank cells appended to or edited within a list, due to the fact that the user may have intended any prior formatting, formula or lack thereof to remain in effect. Next, at step 204 a determination of made as to whether the previously blank cell is an extension of a list of cells, as defined in the exemplary embodiment. Again, a list is defined in the exemplary embodiment as a number of successive cells, in a column or a row, that have a consistent data type. A more detailed description of routine 204 is provided below with respect to FIG. 3.

If at step 206 it is determined that the previously blank cell is not an extension of or within a list, the method terminates at step 214 and no action is taken with respect to the previously blank newly edited cell. However, if the previously blank, newly edited cell is determined to be an extension of or within a list, the method proceeds to step 210, where any consistent formatting of the list is extended to include the previously blank, newly edited cell if that cell has "default" formatting, excluding conditional formatting rules, applied thereto. In the exemplary embodiment, a "previously blank, newly edited cell" is a cell that, immediately prior to editing, contained no value or only space characters. A more detailed description of routine 210 is provided below with respect to FIG. 4. Whether or not any formatting is extended to include the previously blank, newly edited cell at step 210, the method proceeds to step 212, where any consistent formula or formulas that are applied to the list are extended to include the previously blank cell. A more detailed description of routine 212 is provided below with respect to FIG. 5. The method then ends at step 214.

Figure 3:
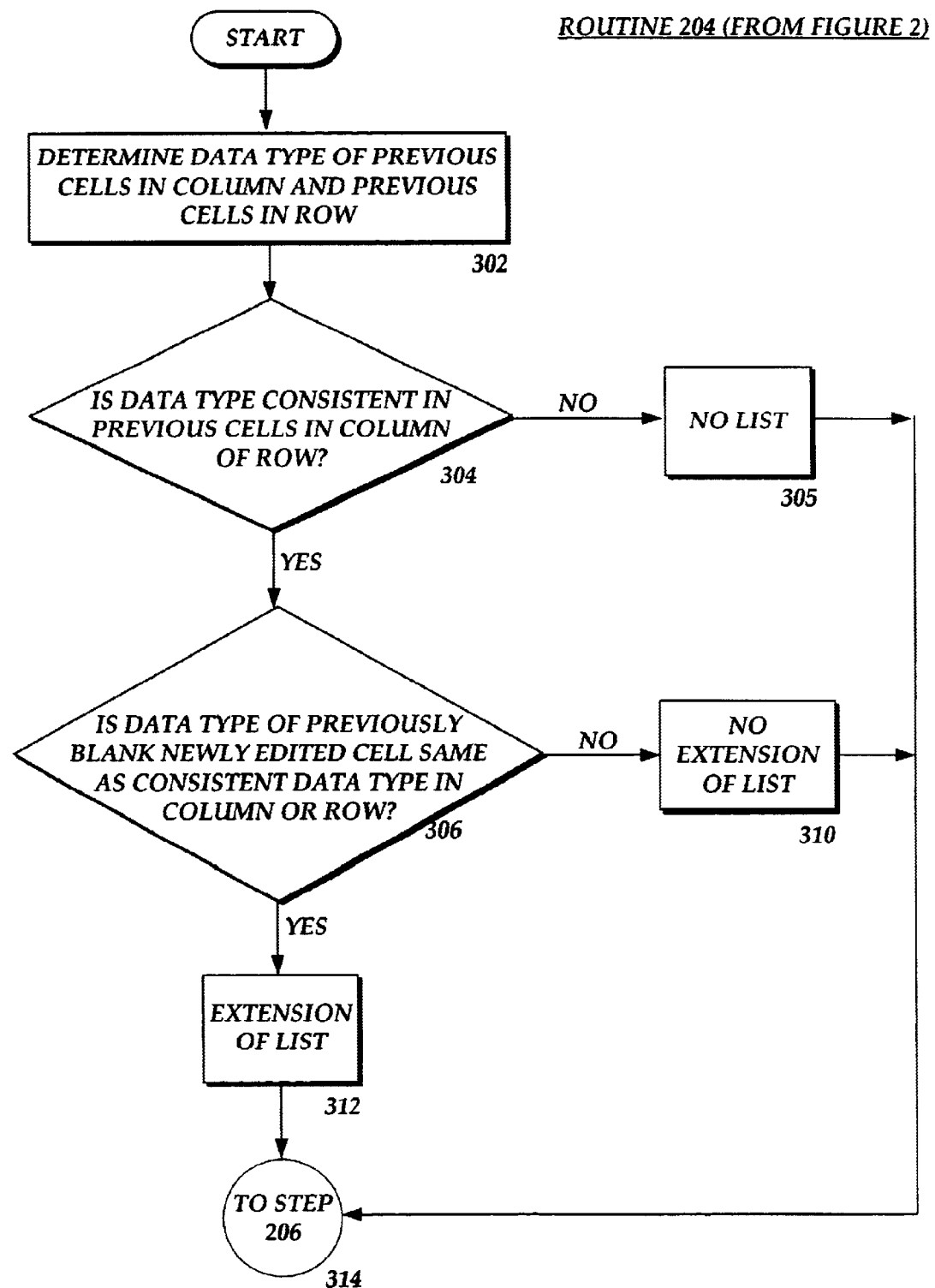
FIG. 3 is a flow chart demonstrating detailed steps involved in the operation of an exemplary embodiment of the present invention.

FIG. 3 describes the steps involved in routine 204 (FIG. 2) for determining if a previously blank cell is an extension of or within a list. Routine 204 begins with step 302, where a determination is made as to whether a number of previous cells have a consistent data type. This determination involves scanning cells above and to the left of the previously blank cell. In the exemplary embodiment, five cells will be scanned in each direction and the data type of the five cells is considered to be consistent if three of the five cells contain the same data type. Those skilled in the art will appreciate that the number of cells to be scanned and the definition of a consistent data type may be altered without departing from the spirit and scope of the present invention. For example, a more conservative definition of consistency would be all five scanned cells having the same data type, whereas a less conservative definition of consistency would be two of the five scanned cells having the same data type.

The exemplary embodiment may be specifically configured to operate in the electronic spreadsheet referred to as "Excel," which is provided by the Microsoft Corporation of Redmond, Washington. As a conservative approach for automatically extending formatting or formulas in Microsoft Excel, the scan of step 302 will only occur when the following conditions are met: an Excel macro is not currently executing, the user is not in group sheet edit mode, the user has the functionality of the present invention enabled, the cell was blank (i.e., contained no value or contained only space characters) before the user entered data into it, and data is being entered into only one cell. Also, as an optimization, the scan of step 302 is only done when the previously blank cell is greater than two cells away from the edge of a worksheet, since the definition of consistent data type requires at least three cells with the same data type to determine the cell is at the end of a list. Thus, less than five cells may be scanned when the previously blank cell is within fewer than five cells of the top or left edge of the worksheet. Also in the exemplary embodiment, a cell that contains no values at all or only contains space characters is ignored when scanning for data type. Additionally, any hidden rows due to a filter operation are completely skipped and have no impact on the information gathered during the scan of step 302. Further, a merged cell that does not cover the same size area as the previously blank, newly edited cell is ignored when scanning for data type and formatting.

The scan of step 302 is actually done in two phases. First, a scan is done of the previous cells in the current column. Next, a scan is done of the previous cells in the current row. In this way, the present invention may determine whether the previously blank cell is an extension of or within a column list, a row list, or both. If it is determined at step 304 that the previous cells (in the column, row or both) contain a consistent data type and the data type is not a formula or if the consistent data type is a formula and that the same previous cells have a consistent formula, it is concluded that the previous cells comprise a list. If no list is located, as indicated at step 305, the routine proceeds to step 314, where control is returned to method 200 (FIG. 2). If a list is found, however, a determination is made at step 306 as to whether the previously blank newly edited cell also contains the consistent data type of the list. If the previously blank newly edited cell has the same consistent data type as the list, it is considered to be an extension of the list, as indicated at step 312. Otherwise, if the previously blank newly edited cell does not contain the consistent data type of the list, it is not considered to be an extension of or within the list, as indicated at step 310. In any event, the routine then terminates at step 314, where control is returned to method 200 (FIG. 2).

Figure 4:
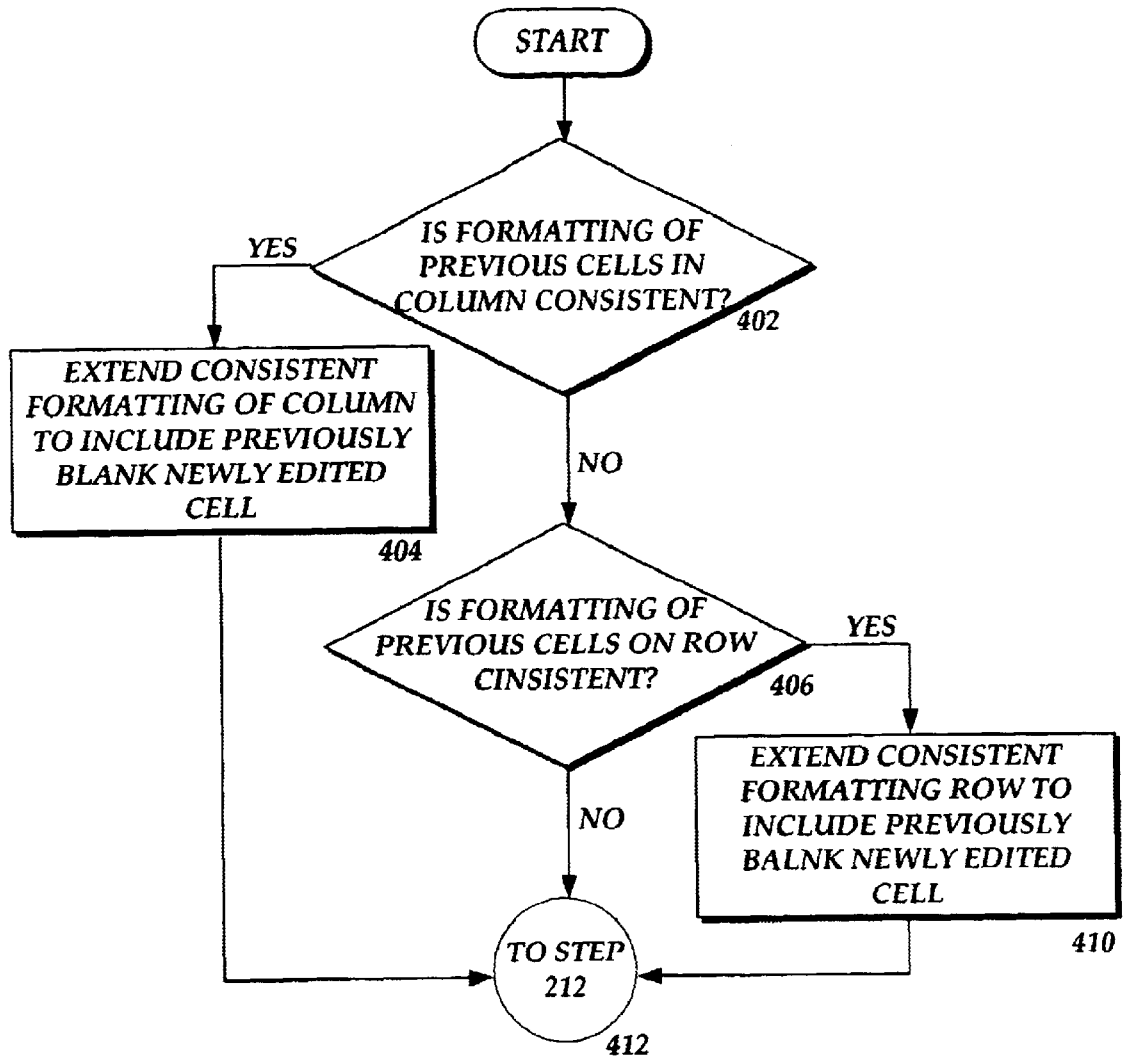
FIG. 4 is a flow chart demonstrating detailed steps involved in the operation of an exemplary embodiment of the present invention.

FIG. 4 is a flow chart setting forth the steps involved in routine 210 (FIG. 2), which is directed toward applying any consistent formatting of the list to the previously blank newly edited cell. Routine 210 begins with step 402, where the formatting of a number of previous cells in the column above the previously blank newly edited cell is examined for consistency. Those skilled in the art will recognize that step 402 assumes that a column list has been located. If no column list exists, step 402 is unnecessary. If the formatting of the column list is determined at step 402 to be consistent, the consistent formatting is applied to the previously blank newly edited cell if the cell has only default formatting applied thereto (ignoring conditional formatting, which is handled as a special case). Again, as defined herein, a previously blank cell is one that has no value or only contains space characters. In the exemplary embodiment, consistent formatting of a column list takes precedence over consistent formatting in a row list. Thus, if consistent formatting of a column list is applied to the previously blank newly edited cell in step 404, the routine proceeds to step 412, where control is returned to method 200 (FIG. 2). However, if at step 420 no consistent formatting was located in the column list or if there was no column list was found, the routine moves on to step 406, where a scan for consistent formatting in a row list is conducted. Again, those skilled in the art will appreciate that step 406 would be unnecessary in the event that no row list exists. If consistent formatting is discovered in the row list, the consistent formatting is applied to the previously blank newly edited cell at step 410 and at step 412 control of the routine is returned to method 200 (FIG. 2). Otherwise, the routine proceeds directly to step 412.

Some electronic spreadsheets allow "conditional formatting," which means that a specified type of formatting will only be applied to a cell or group of cells when certain conditions are true. As noted above, the exemplary embodiment of the present invention may be configured to handle conditional formatting in a special manner. For example, if the previously blank newly edited cell previously contained conditional formatting, "regular" consistent formatting from a list of cells may still be extended thereto, while any conditional formatting included in the consistent formatting of the list will not be extended. Also, if the previously blank newly edited cell did not previously contain conditional formatting, any conditional formatting included in the consistent formatting of the list of cells may be extended to the previously blank newly edited cell.

Those skilled in the art will appreciate that the present invention may also be configured to handle other special cases. For instance, another situation requiring special attention may be the automatic extension of a percentage number format to a previously blank newly edited cell. Typically, when a percentage number format is applied to a value, the value is multiplied by 100 and the "%" symbol is inserted. As an example, if a user enters the number "0.5" into a cell that is appended to a list of cells consistently formatted with the percentage number format, the user most likely intends to see the value displayed as "50%". However, if a user enters the number "5" into the cell, the user most likely intends to see the value displayed as "5%," not "500%." Therefore, in the second case, the input number "5" must be divided by 100 before the percentage number formatting is applied thereto. Thus, in order to provide the user with the most likely desired result, the present invention may include an algorithm for determining when to divide an input number by one hundred. Such an algorithm may be as follows: if the absolute value of the input number is greater-than or equal-to one, then divide the input number by one hundred prior to applying the percentage number format; otherwise, do not change the input number prior to applying the percentage number format.

In the exemplary embodiment, consistent formatting is defined as three of five cells in a list having the exact same formatting options. Following the conservative approach, the entirety of the formatting, excluding cell borders but including conditional formatting rules, of each cell must be consistent. If just one formatting element, excluding the cell borders, is inconsistent, the formatting will not be considered consistent. During the scan, however, any cell with hyperlink formatting is ignored.

According to the exemplary embodiment, when merged cells are compared for consistent formatting, each merged cell must cover the same size area (the number of rows and/or columns combined by the merge operation) to be considered equivalent. Furthermore, when it is determined that there is consistent formatting within a list, another check may be performed to determine if the list contains a formatting pattern, such as two different types of formatting in alternating cells. Formatting patterns may also be extended to the previously blank newly edited cell. Those skilled in the art will appreciate that any formatting pattern may be detected and extended, given a list of sufficient size. However, given the constraints of the exemplary embodiment, namely that only five previous cells define a list, a scan will only be conducted for two alternating formatting patterns.

Separately from a cell's entire formatting, information is collected about the consistent left and right cell borders of the cells in a list. When the consistent formatting is copied to the previously blank newly edited cell, the top, bottom, and diagonal borders are never copied and the left and right borders are copied based on their own consistency information. Again, the treatment of borders is due to a conservative approach in the exemplary embodiment and is not considered to be a limitation of the scope of the present invention. Those skilled in the art will recognize that borders may be handled in the same manner as other formatting options, if desired.

Figure 5:
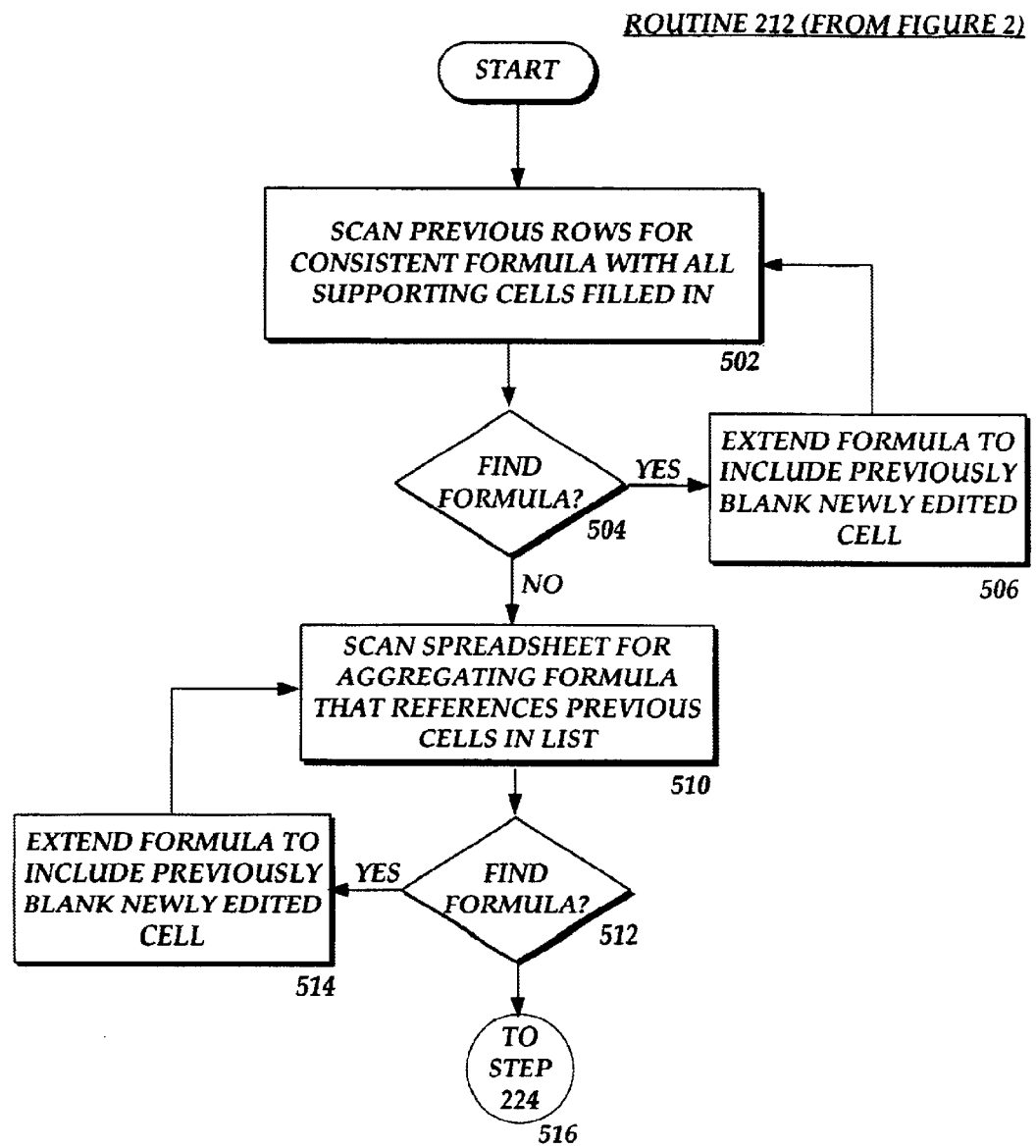
FIG. 5 is a flow chart demonstrating detailed steps involved in the operation of an exemplary embodiment of the present invention.

FIG. 5 is a flow chart describing the steps involved in routine 212 (FIG. 2), which is aimed at applying any consistent formula in the list of cells to the previously blank newly edited cell. Routine 212 begins with step 502, where a scan of the rows above the previously blank newly edited cell is performed to discover the existence of a consistent formula. In other words, the previous spreadsheet rows are examined for formulas that perform calculations, based on the columns in the previous rows, in a consistent manner. If the previously blank newly edited cell corresponds to the last of the necessary values for the entire calculation consistent with the previous rows, and a consistent formula is found at step 504 then the consistent formula is copied down to the row containing the previously blank newly edited cell at step 506. In the exemplary embodiment, certain conditions must be met before a consistent formula is copied down to a row containing the previously blank newly edited cell: the formula must not contain any "English-language" formula references; the formula must not contain any relative. references to rows other than to the current row; and the formula must not contain any references to labeled ranges. Also, the following conditions must be met before the consistent formula is copied down to row containing a previously blank newly edited cell: the new cell cannot be locked or hidden, and the formula's supporting cells must have the same type(s) in the row containing the previously blank newly edited cell as the corresponding cell(s) in the previous row. Additionally, as a conservative approach, array-entered formulas or table formulas will not be considered to be consistent formulas and therefore will not be automatically extended. Still, those having ordinary skill in the art will recognize that constraints built into the exemplary embodiment are for conservatism only and are not intended to limit the scope of the present invention.

After applying a consistent formula to the row containing the previously blank newly edited cell, the routine returns to step 502 to search for additional formulas in previous rows. Those skilled in the art will recognize that more than one formula may be applied to a row of cells in a spread sheet. When it is determined at step 504 that no other consistent formulas are located in previous rows, the routine proceeds to step 510, where a scan downward and/or rightward is performed to determine if the previously blank newly edited cell is an extension of an aggregated column/row of values in the list. In the exemplary embodiment, the scan of step 510 scans up to a maximum of twenty cells but won't scan past a non-blank cell or a cell that contains a formula which is also locked or hidden. Also, a non-blank cell is evaluated for a formula that aggregates cells in the list adjacent to the previously blank newly edited cell. As a conservative approach, the exemplary embodiment defines an aggregating formula as a formula that has a relative reference to a contiguous range of cells. The range of cells must include at least the two most previous cells to the previously blank newly edited cell and must not contain the previously blank newly edited cell. Also the formula must only refer to cells in the column/row containing the previously blank newly edited cell and must only use the "plus" operator or one of the following functions: "subtotal," "sum," "average," "min," "max," "count," "counta," "stdev," "stdevp," "var," "varp," and "product." In addition, the cell most previous to the first aggregated cell in the range must have a different data type than the aggregated cells.

A formula may be evaluated in logical components, rather than as a whole. Thus, a formula may have zero or more logical components that are extended to include the previously blank newly edited cell, as well as zero or more logical components that are not extended. Each logical component of a formula should adhere to the rules mentioned in the preceding paragraph. In practice, a logical component of a formula represents either (1) the values enclosed in parentheses; or (2) everything outside of the parentheses and excluding the information inside the parentheses. In the exemplary embodiment, an exception to the evaluation of a formula's logical components are "array-entered formulas" and "table formulas," which are not considered aggregate formulas. Example formulas are as follows: =sum(a1:a12)+ $m$3 and =sum(b2:b12)+$g$2. The example formulas include consistent logical components consisting of the values inside the parentheses.

If an aggregating formula is found at step 512, the formula will be updated at step 514 to include the value of the data in the previously blank newly edited cell. As another feature in the exemplary embodiment, the updated cell will be made to "flash" once to indicate that the formula in that cell was changed. The scan of step 510 is then repeated until no other aggregating formulas can be found. At that point, the routine proceeds to step 516, where control is returned to method 200 (FIG. 2).

Alternate Embodiments

The broad principles of the present invention, namely the detection and extension of consistent formatting and/or formulas are applicable to other aspects of electronic spreadsheets. For example, Microsoft Excel may be configured to detect consistent formatting in a Query Table column and apply that consistent formatting to new records that are returned upon the Query Table being refreshed. Also Microsoft Excel may be configured to search for a formula that aggregates a column in a Query Table and perform an action based on the result. These and other variations of the present invention will be apparent to those having ordinary skill in the art.

Exemplary Operating Environment

Figure 6:
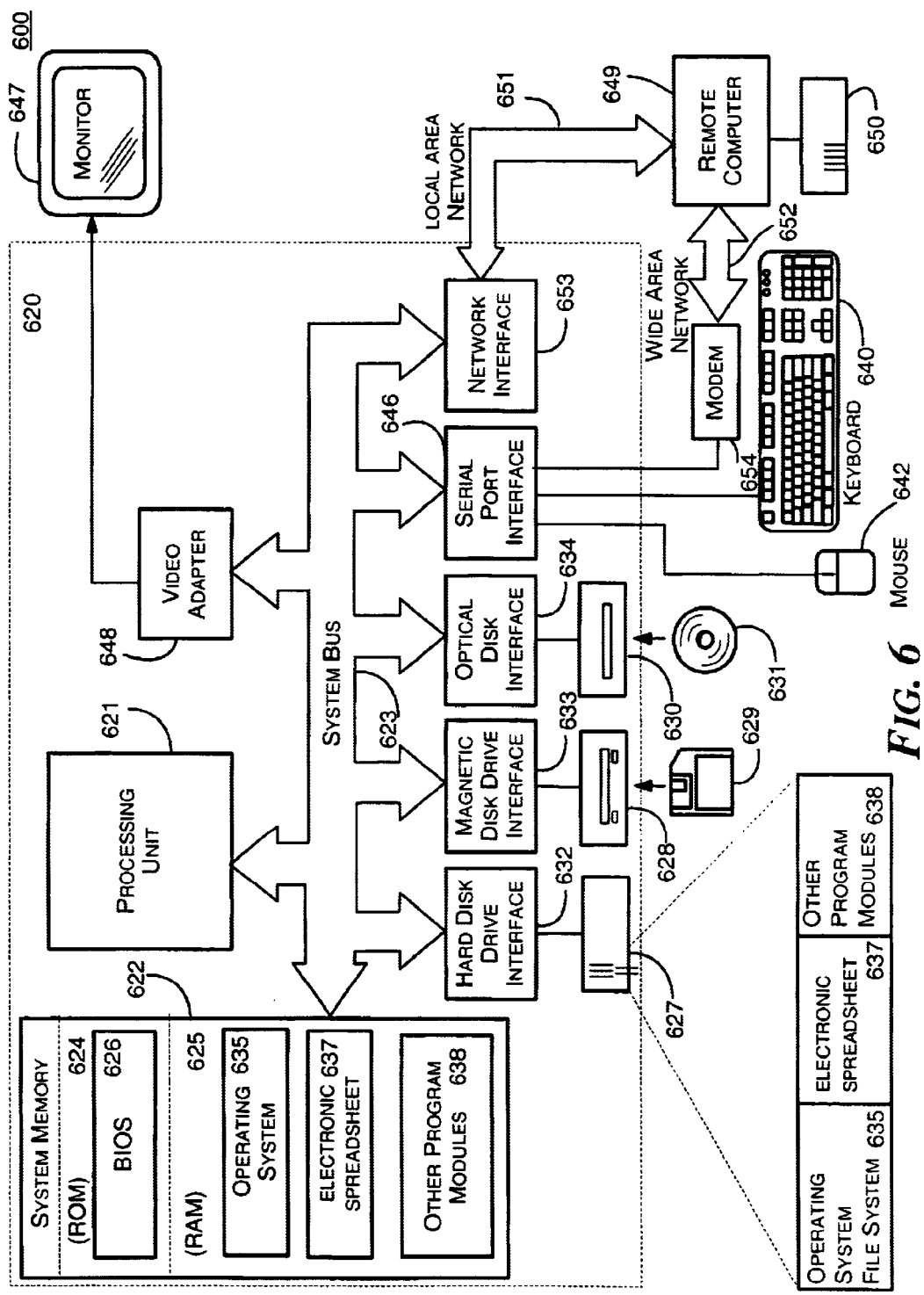
FIG. 6 is a functional block diagram of a computer system that provides an operating environment for the exemplary embodiments of the present invention.

FIG. 6 and the following discussion are intended to provide a brief, general description of a suitable computing environment in which the invention may be implemented. The term "electronic spreadsheet" is commonly used to describe an application program module that provides spreadsheet functionality via a computer system. While the invention will be described in the general context of an electronic spreadsheet that is run by an operating system in conjunction with a personal computer, those skilled in the art will recognize that the invention also may be implemented in combination with other program modules. Generally, program modules include routines, programs, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary operating environment 600 for implementing the invention includes a conventional personal computer system 620, including a processing unit 621, a system memory 622, and a system bus 623 that couples the system memory 622 to the processing unit 621. The system memory 622 includes read only memory (ROM) 624 and random access memory (RAM) 625. A basic input/output system 626 (BIOS), containing the basic routines that help to transfer information between elements within the personal computer system 620, such as during start-up, is stored in ROM 624.

The personal computer system 620 further includes a hard disk drive 627, a magnetic disk drive 628, e.g., to read from or write to a removable magnetic disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage for the personal computer system 620. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

The computer system 620 may include additional input devices (not shown), such as a microphone, joystick, game pad, satellite dish, scanner, or the like. These and other input devices are often connected to the processing unit 621 through a serial port interface 646 that is coupled to the system bus, but may be connected by other interfaces, such as a game port or a universal serial bus (USB). A monitor 647 or other type of display device is also connected to the system bus 623 via an interface, such as a video adapter 648. In addition to the monitor, personal computer systems typically include other peripheral output devices (not shown), such as speakers or printers.

The personal computer system 620 may operate in a networked environment using logical connections to one or more remote computer systems, such as a remote computer system 649. The remote computer system 649 may be a server, a router, a peer device or other common network node, and typically includes many or all of the elements described relative to the personal computer system 620, although only a memory storage device 650 has been illustrated in FIG. 6. The logical connections depicted in FIG. 6 include a local area network (LAN) 651 and a wide area network (WAN) 652. Such networking environments are commonplace in offices, enterprise-wide computer networks, intranets and the Internet.

When used in a LAN networking environment, the personal computer system 620 is connected to the LAN 651 through a network interface 653. When used in a WAN networking environment, the personal computer system 620 typically includes a modem 654 or other means for establishing communications over a WAN 652, such as the Internet. The modem 654, which may be internal or external, is connected to the system bus 623 via the serial port interface 646. In a networked environment, program modules depicted relative to the personal computer system 620, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 653.

A number of program modules may be stored in the drives and RAM 625 of the computer system 620, including an operating system 635, an electronic spreadsheet 637 and other program modules 638. In particular, the electronic spreadsheet 637 may comprise computer executable instructions for performing the methods of the present invention.

In view of the foregoing, it will be appreciated that the present invention provides an electronic spreadsheet with functionality to automatically apply formulas and/or formatting to a cell. Still, it should be understood that the foregoing relates only to the exemplary embodiments of the present invention, and that numerous changes may be made thereto without departing from the spirit and scope of the invention as defined by the following claims.

We claim:

1. A method for automatically applying a formula to a cell in an electronic spreadsheet comprising:
    determining that a previously blank newly edited cell is an extension to or within a list of cells;
    determining that the list of cells has a consistent formula;
    determining that all the supporting cells of the formula are populated in the same row as the previously blank newly edited cell; and
    automatically extending the consistent formula to include the previously blank newly edited cell.

2. The method of claim 1, wherein the step of determining that a previously blank newly edited cell is an extension to a list of cells comprises:
    determining that a plurality of previous cells have a consistent data type; and
    determining that the previously blank newly edited cell also has the consistent data type.

3. The method of claim 2, wherein the plurality of previous cells are above the previously blank newly edited cell in a column.

4. The method of claim 2, wherein the plurality of previous cells are beside the previously blank newly edited cell in a row.

5. The method of claim 1, wherein the step of determining that the list of cells has a consistent formula comprises determining that a plurality of previous rows include the same formula.

6. A computer readable medium having stored thereon computer-executable instructions which, when executed by a computer, cause the computer to perform a method for automatically applying a formula to a cell in an electronic spreadsheet comprising the steps of:
    determining that a previously blank newly edited cell is an extension to or within a list of cells;
    determining that the list of cells has a consistent formula;
    determining that all the supporting cells of the formula are populated in the same row as the previously blank newly edited cell; and
    automatically extending the consistent formula to include the previously blank newly edited cell.

7. The method of claim 1, wherein the step of determining that the list of cells has a consistent formula comprises determining that a plurality of cells in the list are referenced by an aggregation formula.

8. The computer readable medium of claim 6, wherein the step of determining that the list of cells has a consistent formula comprises determining that a plurality of previous rows include the same formula.

9. The computer readable medium of claim 6, wherein the step of determining that the list of cells has a consistent formula comprises determining that a plurality of cells in the list are referenced by an aggregation formula.

10. A method for automatically applying a format and a formula to a cell in an electronic spreadsheet comprising:
    determining that a plurality of previous cells have a consistent data type; and
    determining that a previously blank newly edited cell also has the consistent data type; and
    automatically extending any formula referencing the plurality of previous cells to include the previously blank newly edited cell.

11. The method of claim 10, wherein the plurality of previous cells are above the previously blank newly edited cell in a column.

12. The method of claim 10, wherein the plurality of previous cells are beside the previously blank newly edited cell in a row.

13. A computer readable medium having stored thereon computer-executable instructions which, when executed by a computer, cause the computer to perform a method for automatically applying a format and a formula in a cell in an electronic spreadsheet comprising the steps of:
    determining that a plurality of previous cells have a consistent data type; and
    determining that a previously blank newly edited cell also has the consistent data type; and
    automatically extending any formally referencing the plurality of previous cells to include the previously blank newly edited cell, wherein the plurality of previous cells are beside the previously blank newly edited cell in a row.

14. The method of claim 10, wherein the consistent formula referencing the number of previous cells comprises a function aggregating the number of previous cells; and
    wherein extending the formula to include the previously blank newly edited cell comprises updating the function to include a value stored in the previously blank newly edited cell.

* * * * *

UNITED STATES PATENT AND TRADEMARK OFFICE
CERTIFICATE OF CORRECTION

PATENT NO.    : 6,640,234 B1
DATED         : October 28, 2003
INVENTOR(S)   : Coffen et al.

It is certified that error appears in the above-identified patent and that said Letters Patent is hereby corrected as shown below:

Column 3,
Line 44, "is intended describe" should read -- is intended to describe --

Column 5,
Line 12, "a determination of made" should read -- a determination made --

Column 8,
Lines 33-34, "any relative.references to rows" should read -- any relative references to rows --

Signed and Sealed this

Sixteenth Day of March, 2004

JON W. DUDAS
*Acting Director of the United States Patent and Trademark Office*